US011913347B2

(12) United States Patent
Katayama

(10) Patent No.: US 11,913,347 B2
(45) Date of Patent: Feb. 27, 2024

(54) VALVE DEVICE AND VALVE LID

(71) Applicant: MITSUBISHI HEAVY INDUSTRIES COMPRESSOR CORPORATION, Tokyo (JP)

(72) Inventor: Takuya Katayama, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 18/172,528

(22) Filed: Feb. 22, 2023

(65) Prior Publication Data

US 2023/0272722 A1 Aug. 31, 2023

(30) Foreign Application Priority Data

Feb. 25, 2022 (JP) ................................ 2022-027482

(51) Int. Cl.
*F01D 25/00* (2006.01)
*F01D 17/12* (2006.01)

(52) U.S. Cl.
CPC ........... *F01D 25/002* (2013.01); *F01D 17/12* (2013.01); *F05D 2220/31* (2013.01); *F05D 2230/72* (2013.01); *F05D 2260/60* (2013.01); *F05D 2260/95* (2013.01)

(58) Field of Classification Search
CPC .......................... F01D 25/002; F05D 2220/31
See application file for complete search history.

(56) References Cited

U.S. PATENT DOCUMENTS

| | | | |
|---|---|---|---|
| 4,850,793 A | 7/1989 | Silvestri, Jr. et al. |
| 5,018,355 A | 5/1991 | Foster |
| 5,938,402 A | 8/1999 | Bochud et al. |
| 6,311,704 B1 | 11/2001 | Foster |
| 6,550,487 B1 | 4/2003 | Duckett et al. |
| 2015/0345710 A1 | 12/2015 | Yu et al. |

FOREIGN PATENT DOCUMENTS

| | | |
|---|---|---|
| CN | 206796156 U | 12/2017 |
| EA | 029411 B1 | 3/2018 |
| EP | 3517740 A1 | 7/2019 |
| JP | 2016-183608 A | 10/2016 |

*Primary Examiner* — Brian O Peters
(74) *Attorney, Agent, or Firm* — Osha Bergman Watanabe & Burton LLP

(57) ABSTRACT

A valve device includes: a valve box in which an inlet flow passage into which steam flows and an outlet flow passage through which the steam flows are formed, and in which a valve chamber that connects the inlet flow passage and the outlet flow passage is formed; and a plurality of valve bodies configured to regulate a flow rate of the steam flowing through the outlet flow passage by relative movement to the outlet flow passage. The valve box includes a valve box main body in which the inlet flow passage, the outlet flow passage, and an opening portion are formed, a lid portion that is attachable to and detachable from the valve box main body and closes the opening portion, and a cleaning nozzle that is disposed to penetrate through the lid portion and is configured to supply a cleaning liquid into the valve chamber from the outside.

4 Claims, 4 Drawing Sheets

VALVE DEVICE AND VALVE LID

BACKGROUND OF THE INVENTION

Field of the Invention

The present disclosure relates to a valve device and a valve lid.

Priority is claimed on Japanese Patent Application No. 2022-027482, filed Feb. 25, 2022, the content of which is incorporated herein by reference.

Description of Related Art

A steam turbine is equipped with a steam valve device to regulate supply of steam from a boiler to a turbine main body. For example, Patent Document 1 discloses a specific structure of a steam valve device for regulating the amount of steam supplied to the steam turbine.

Prior Art Document

Patent Document

[Patent Document 1] Japanese Unexamined Patent Application, First Publication No. 2016-183608

SUMMARY OF THE INVENTION

Incidentally, there are cases in which a cleaning liquid for cleaning the inside of a steam turbine (a casing or the like) is supplied through the steam valve device. In a case in which the steam valve device does not have a function of supplying the cleaning liquid into the casing, a configuration that provides this function may be additionally installed in the steam valve device. In this case, it is necessary to reduce a cost required for the additional installation and ensure maintainability.

The present disclosure provides a valve device and a valve lid that can reduce a cost required for adding a function of supplying a cleaning liquid into a steam turbine and ensure maintainability.

A valve device according to the present disclosure includes: a valve box in which an inlet flow passage into which steam flows and an outlet flow passage through which the steam flows are formed, and in which a valve chamber that connects the inlet flow passage and the outlet flow passage is formed; and a plurality of valve bodies configured to regulate a flow rate of the steam flowing through the outlet flow passage by relative movement to the outlet flow passage, in which the valve box includes a valve box main body in which the inlet flow passage, the outlet flow passage, and an opening portion are formed, a lid portion that is attachable to and detachable from the valve box main body and is configured to close the opening portion, and a cleaning nozzle that is disposed to penetrate through the lid portion and is configured to supply a cleaning liquid into the valve chamber from an outside.

A valve lid according to the present disclosure includes: a lid portion that is attachable to and detachable from a valve box including a valve chamber and is configured to close an opening portion of the valve box; and a cleaning nozzle that is disposed to penetrate the lid portion and is configured to supply a cleaning liquid into the valve chamber from an outside.

According to the present disclosure, it is possible to provide a valve device and a valve lid that can reduce a cost required for adding a function of supplying a cleaning liquid into a steam turbine and ensure maintainability.

DETAILED DESCRIPTION OF THE INVENTION

Hereinafter, an embodiment for implementing a steam turbine and a valve device according to the present disclosure will be described with reference to the accompanying drawings.

(Steam Turbine)

Figure 1:
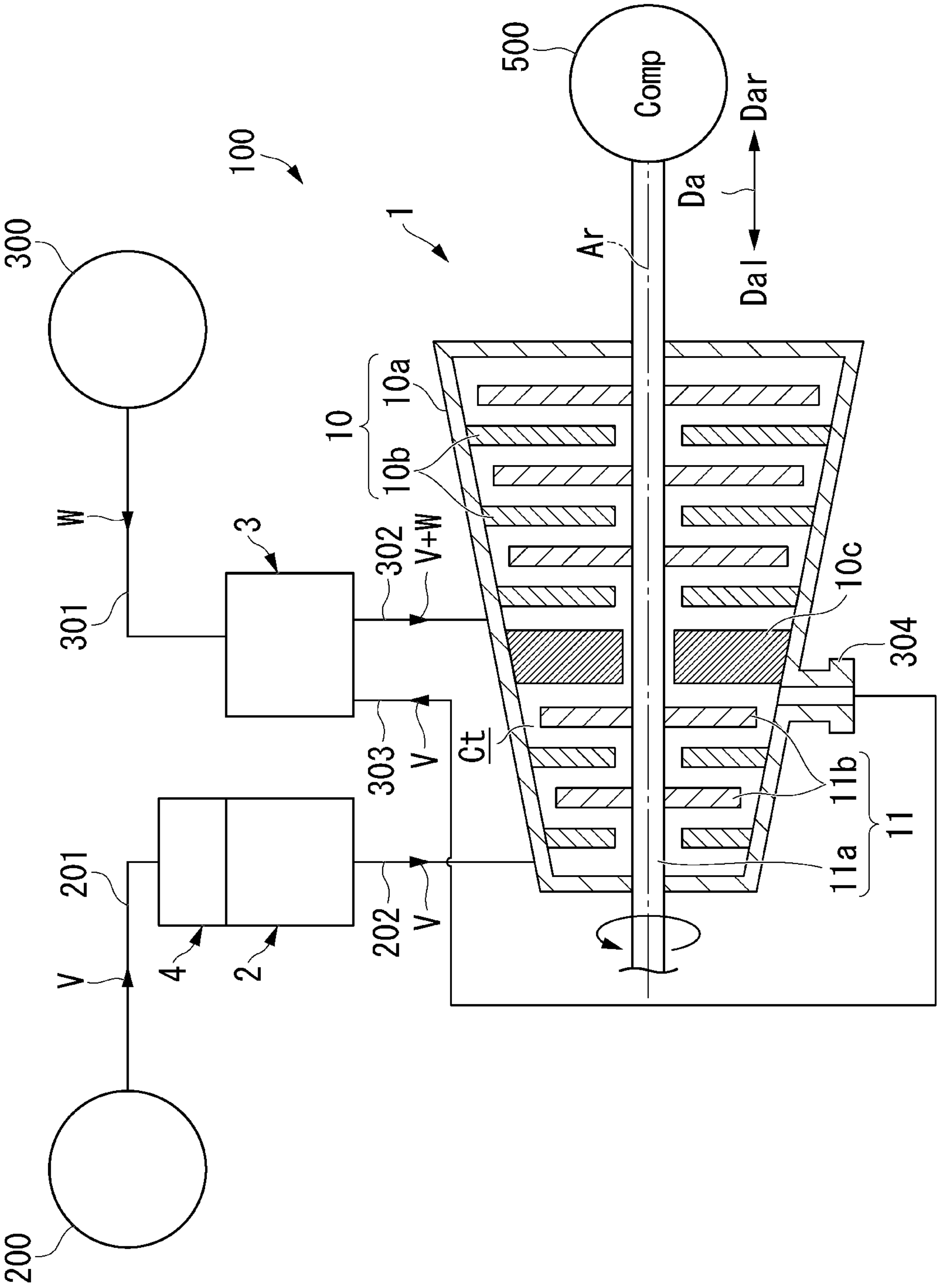
FIG. 1 is a schematic configuration diagram of a steam turbine according to an embodiment of the present disclosure.

As shown in FIG. 1, a steam turbine 100 includes a turbine main body 1, a main steam valve 2, an extraction valve 3 (valve device), and a main stop valve 4.

Steam V is supplied to the turbine main body 1 from a steam supply source 200 such as a boiler. The turbine main body 1 includes a turbine casing 10 and a turbine rotor 11 that rotates within the turbine casing 10 by the steam V supplied into the turbine casing 10.

The turbine casing 10 is formed of a casing main body 10*a*, a plurality of stator vane rows 10*b*, and a partition plate 10*c*. The casing main body 10*a* covers the turbine rotor 11 from the outside. The casing main body 10*a* forms a flow passage Ct through which the steam V flows together with the turbine rotor 11. The stator vane rows 10*b* are integrally formed with the casing main body 10*a*.

The turbine rotor 11 is formed of a rotating shaft 11*a* and a plurality of rotor blade rows 11*b*. The rotating shaft 11*a* is a rotating shaft 11*a* that is rotatable around an axis Ar extending in a horizontal direction. The rotor blade rows 11*b* are integrally formed with the rotating shaft 11*a*.

Hereinafter, a direction in which the axis Ar extends is simply referred to as an "axial direction Da". Further, one side (left side in FIG. 1) in the axial direction Da is simply referred to as "one side Dal". The other side (right side in FIG. 1) in the axial direction Da is simply referred to as "the other side Dar".

Of directions orthogonal to the axis Ar, an up-down direction (up-down direction in FIG. 2), which is perpendicular to the horizontal direction, is referred to as a "vertical direction Dv". Further, an upper side (upper side in FIG. 2) in the vertical direction Dv is referred to as an "upper side Dvu". An opposite side (lower side in FIG. 2) to the upper side Dvu in the vertical direction Dv is referred to as a "lower side Dvd".

Here, the partition plate 10*c* is integrally formed with the casing main body 10*a*. The partition plate 10*c* is disposed between the stator vane rows 10*b* in the axial direction Da. In the present embodiment, the plurality of stator vane rows 10*b* are disposed on each of one side Dal and the other side Dar with the partition plate 10*c* as a boundary. The partition plate 10*c* divides the inside of the flow passage Ct into two spaces in the axial direction Da, for example, together with a sealing device or the like (not shown) disposed between the partition plate 10*c* and the rotating shaft 11*a*.

The stator vane rows 10*b* of the turbine casing 10 and the rotor blade rows 11*b* of the turbine rotor 11 are alternately arranged in the axial direction Da. Rotation of the turbine rotor 11 is transmitted via the rotating shaft 11*a* to a compressor 500 connected to the one side Dal of the rotating shaft 11*a*, for example. The compressor 500 compresses a fluid, such as a gas, by being rotated by the rotating shaft 11*a*.

The main stop valve 4 is a closing valve (trip and throttle valve (TTV)). The main steam valve 2 and the extraction valve 3 are composite valves in which a regulating valve (governing valve (GV)), a closing valve (trip and throttle valve (TTV)), and an overload valve are integrated. The main steam valve 2 and the main stop valve 4 are disposed on an inlet side of the one side Dal in the turbine main body 1. The main steam valve 2 and the main stop valve 4 regulate the amount of the steam V supplied to the turbine main body 1.

A first steam supply line 201 connected to the steam supply source 200 and the main steam valve 2 are connected to the main stop valve 4. A second steam supply line 202 connected to the turbine main body 1 is connected to the main steam valve 2. The main steam valve 2 regulates the amount of the steam V supplied from the steam supply source 200 through the first steam supply line 201 and the main stop valve 4, and then supplies the steam V to the turbine main body 1 through the second steam supply line 202.

The main steam valve 2 may be directly connected to a suction port (not shown) that is an inlet of the turbine main body 1 by being integrally formed with the turbine casing 10, not via the second steam supply line 202.

The extraction valve 3 is disposed closer to an outlet side of the other side Dar in the turbine main body 1 than the main steam valve 2 is. The extraction valve 3 extracts some of the steam V introduced into the turbine main body 1 and having worked on an upstream side (one side Dal) of the turbine main body 1. A cleaning liquid W is supplied to the extraction valve 3 from a cleaning liquid supply source 300 in which the cleaning liquid W is stored. The extraction valve 3 supplies the supplied cleaning liquid W into the turbine main body 1, together with the extracted steam V. The extraction valve 3 may supply the extracted steam V to an external device other than the turbine main body 1.

An extraction line 303 connected to the turbine main body 1 via an extracted steam outlet 304 formed integrally with the turbine main body 1 and capable of extracting the steam V from the flow passage Ct, a steam line 302 connected to the turbine main body 1, and a cleaning liquid supply line 301 connected to the cleaning liquid supply source 300 are connected to the extraction valve 3. The extraction line 303 is connected to the turbine main body 1 on the one side Dal with respect to the partition plate 10*c* via the extracted steam outlet 304. The steam line 302 is connected to the turbine main body 1 on the other side Dar with respect to the partition plate 10*c*.

The extraction valve 3 may be directly connected to an extraction port of the turbine main body 1 by being integrally formed with the turbine casing 10, not via the extraction line 303 and the steam line 302. Hereinafter, in the present embodiment, the extraction valve 3 is simply referred to as a "valve device 3".

(Valve Device)

Figure 2:
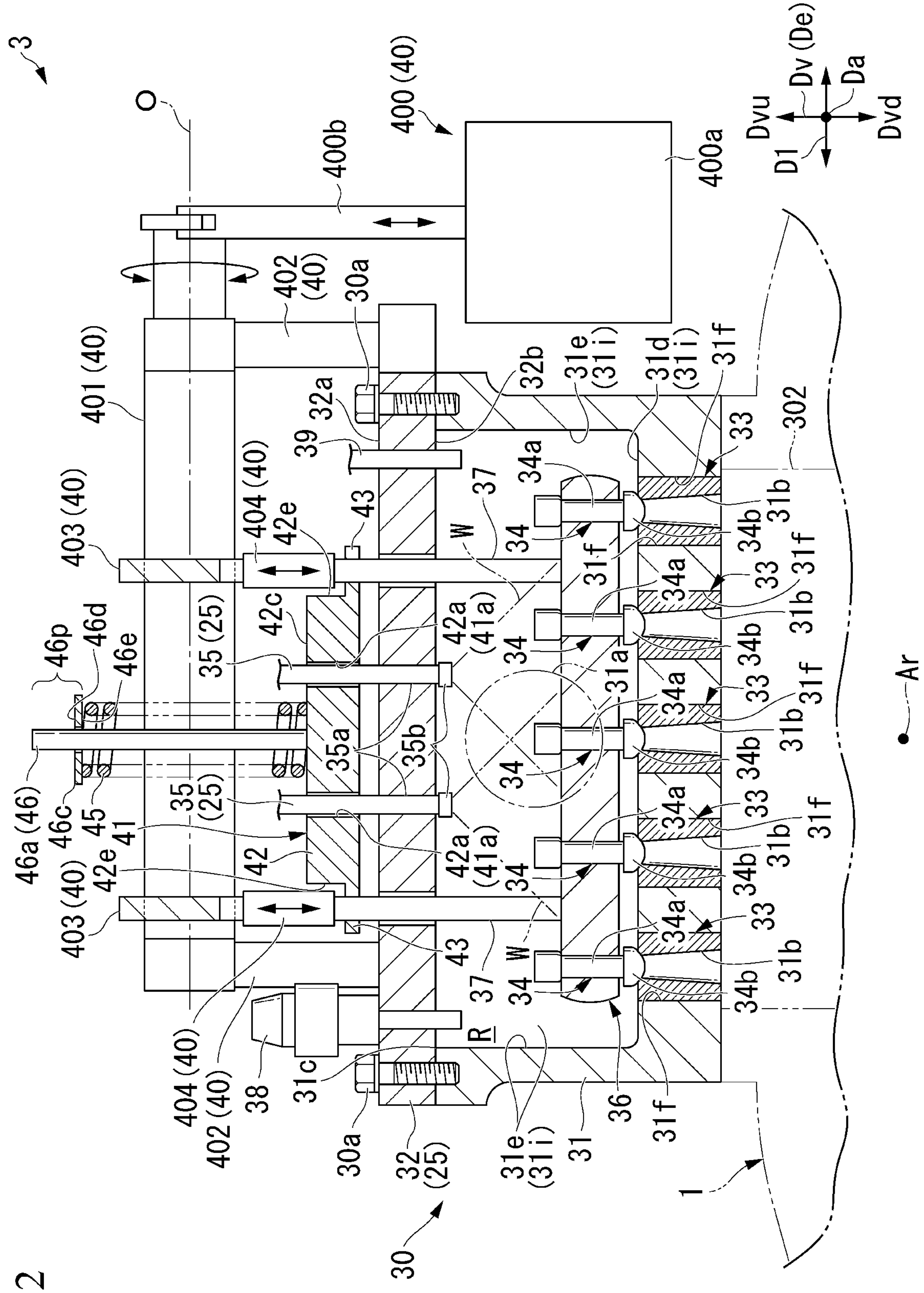
FIG. 2 is a schematic cross-sectional view of a valve device according to the embodiment of the present disclosure from one side.
Figure 3:
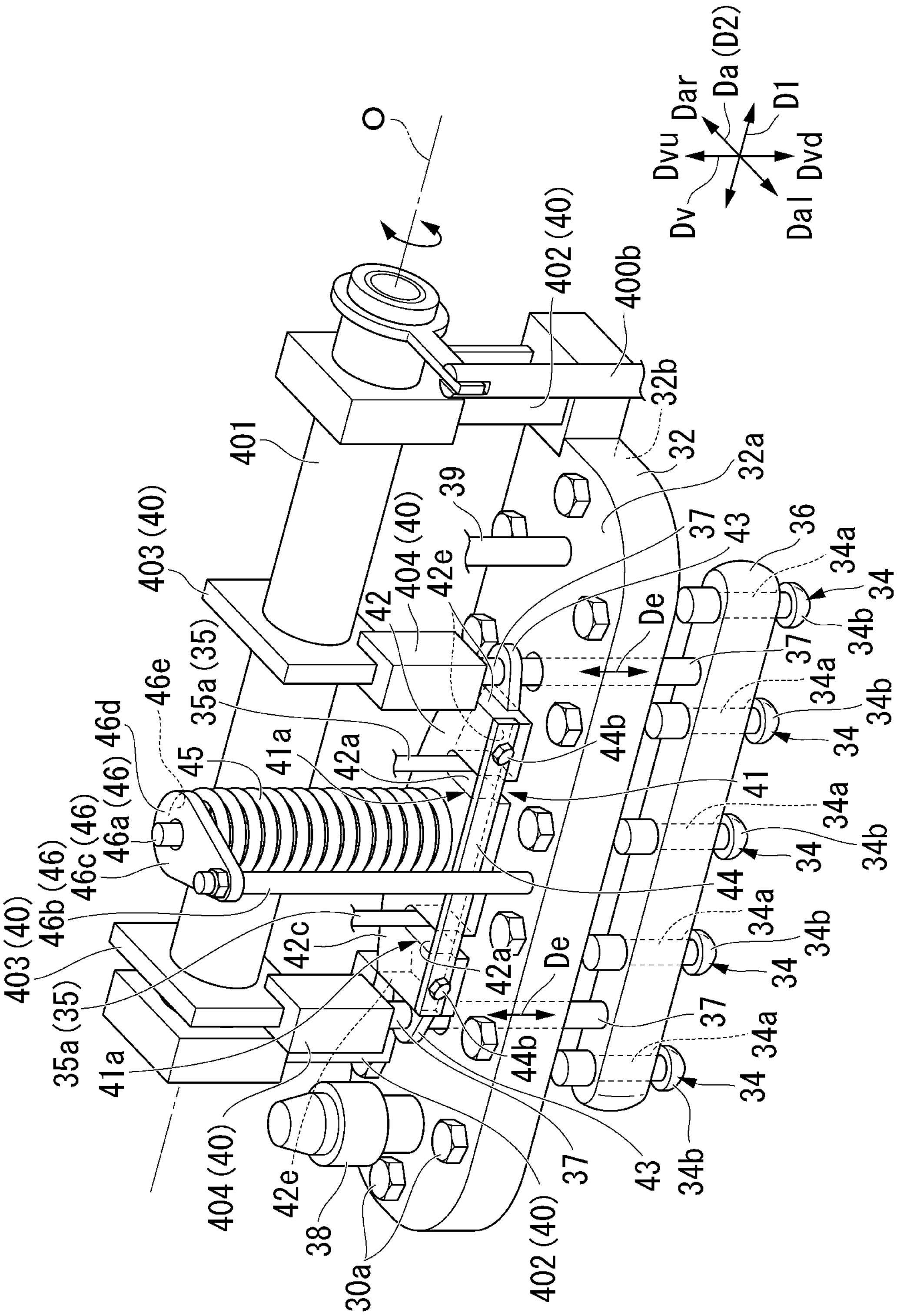
FIG. 3 is a perspective view showing a configuration of a part of the valve device according to the embodiment of the present disclosure.

As shown in FIGS. 2 and 3, the valve device 3 in the present embodiment includes a valve box 30, a valve body 34, an inner bar 36, a rod 37, a drive mechanism 40, a spring support 41, a spring 45, a spring support portion 46, a thermometer 38, and a pressure gauge 39.

(Valve Box)

The valve box 30 supplies the cleaning liquid W supplied from the cleaning liquid supply source 300 through the cleaning liquid supply line 301 into the turbine main body 1 through the steam line 302, together with the steam V extracted through the extraction line 303. That is, a flow passage through which the steam V and the cleaning liquid W flow is formed inside the valve box 30. The valve box 30 is disposed on the upper side Dvu with respect to the turbine main body 1. The valve box 30 includes a valve box main body 31, a lid portion 32, a valve seat portion 33, and a cleaning nozzle 35.

(Valve Box Main Body)

The valve box main body 31 is formed in a box shape. The valve box main body 31 is made of, for example, a metal or the like. Inside the valve box main body 31, an inlet flow passage 31*a* into which the steam V extracted from the turbine main body 1 flows, an outlet flow passage 31*b* through which the steam V flows out, and a valve chamber R that connects the inlet flow passage 31*a* and the outlet flow passage 31*b* are formed. In FIG. 2, the inlet flow passage 31*a* is indicated by a two-dot chain line circle for want of space. The valve chamber R is defined by a bottom surface 31*d* and a side surface 31*e* that form an inner surface 31*i* of the valve box main body 31.

The valve box main body 31 is formed with an opening portion 31*c* that is open so as to open the valve chamber R at a position different from those of the inlet flow passage 31*a* and the outlet flow passage 31*b*. The opening portion 31*c* in the present embodiment is formed in the valve box main body 31 such that the opening portion 31*c* faces the upper side Dvu.

The inlet flow passage 31*a* is connected to the extraction line 303. The inlet flow passage 31*a* is disposed on the one side Dal with respect to the outlet flow passage 31*b* and opens into the valve chamber R on the side surface 31*e* disposed on the one side Dal in the valve box main body 31. Note that the side surface 31*e* on which the inlet flow passage 31*a* opens is not shown for want of space. The outlet flow passage 31*b* is connected to the steam line 302. Here, the outlet flow passage 31*b* is formed by the valve seat portion 33 formed in a tubular shape, which is fixed to a bottom wall on the lower side Dvd in the valve box main body 31. Specifically, the valve seat portion 33 forms the outlet flow passage 31*b* by fitting into a hole 31*f* formed in the bottom wall of the valve box main body 31. The bottom wall has the bottom surface 31*d* facing the upper side Dvu.

A plurality of valve seat portions 33 are disposed on the bottom wall of the valve box main body 31. In the present embodiment, five valve seat portions 33 are disposed on the bottom wall of the valve box main body 31. That is, five outlet flow passages 31*b* are constituted by the inside of these five valve seat portions 33. Each of the valve seat portions 33 is made of, for example, an elastic body.

(Lid Portion)

The lid portion 32 is formed in a plate shape. The lid portion 32 is made of, for example, a metal or the like. The lid portion 32 is attachable to and detachable from the valve box main body 31 and closes the opening portion 31*c* formed in the valve box main body 31 from the upper side Dvu. The lid portion 32 has a front surface 32*a* facing the upper side Dvu and a back surface 32*b* facing a side opposite to the front surface 32*a*.

The lid portion 32 closes the opening portion 31*c* from the upper side Dvu, so that the back surface 32*b* of the lid portion 32 defines the valve chamber R, together with the inner surface 31*i* of the valve box main body 31. The lid portion 32 in the present embodiment closes the opening portion 31*c* by being fixed to the valve box main body 31 with a plurality of bolts 30*a*. The lid portion 32 seals the opening portion 31*c* by being fixed to the valve box main body 31.

(Cleaning Nozzle)

The cleaning nozzle 35 is a nozzle capable of supplying the cleaning liquid W into the valve chamber R from the outside. A pair of cleaning nozzles 35 are disposed with respect to the lid portion 32 while penetrating the lid portion 32. A configuration of the cleaning nozzle 35 will be described below.

(Valve Body)

The valve body 34 is disposed in the valve chamber R, and is capable of regulating a flow rate of the steam V flowing through the outlet flow passage 31*b* by relative movement to the outlet flow passage 31*b*. The number of valve bodies 34 disposed in the valve chamber R is the same as the number of the outlet flow passages 31*b*. In the present embodiment, five valve bodies 34 are disposed in the valve chamber R. The valve body 34 is formed of a shaft portion 34*a* extending in the vertical direction Dv and a sealing portion 34*b* formed integrally with an end part on the lower side Dvd in the shaft portion 34*a* and abuttable on the outlet flow passage 31*b*. The sealing portion 34*b* is made of, for example, an elastic body. As the valve body 34 moves toward the outlet flow passage 31*b* in the valve chamber R, the sealing portion 34*b* of the valve body 34 abuts on the valve seat portion 33. In this case, since the valve seat portion 33 and the sealing portion 34*b* are made of an elastic body, the valve chamber R and the outlet flow passage 31*b* are airtightly isolated.

(Inner Bar)

The inner bar 36 is formed in a columnar shape. The inner bar 36 is made of, for example, a metal or the like. The inner bar 36 is connected to a plurality of the valve bodies 34, and is capable of simultaneously moving the plurality of valve bodies 34 in the valve chamber R. Therefore, the inner bar 36 integrates the plurality of valve bodies 34 in the valve chamber R. In the present embodiment, the shaft portion 34*a* of the valve body 34 is fixed to the inner bar 36 while penetrating the inner bar 36.

(Rod)

The rod 37 is formed in a columnar shape extending in the vertical direction Dv. Hereinafter, for convenience of description, a direction in which the rod 37 extends will be referred to as an extension direction De. That is, in the present embodiment, the extension direction De matches the vertical direction Dv. The rod 37 is made of, for example, a metal or the like. The rod 37 is connected to the inner bar 36 by being disposed to penetrate the lid portion 32. The rod 37 moves the inner bar 36 relative to the outlet flow passage 31*b* by relative movement to the lid portion 32 in the extension direction De. In the present embodiment, a pair of rods 37 are connected to the inner bar 36. Hereinafter, for convenience of description, a direction in which the pair of rods are connected, that is, a direction in which the pair of rods are separated from each other (horizontal direction in FIG. 2), will be referred to as a "separation direction D1".

Here, the cleaning nozzle 35 is disposed in a region between the pair of rods 37 when viewed from the extension direction De in which the rods 37 extend. The cleaning nozzle 35 is made of, for example, a metal or the like. The cleaning nozzle 35 includes a pipe portion 35*a* extending in the vertical direction Dv, and a nozzle portion 35*b* connected to an end part on the lower side Dvd of the pipe portion 35*a*.

The pipe portion 35*a* is a pipe for guiding the cleaning liquid W supplied from the cleaning liquid supply source 300 into the valve chamber R. The pipe portion 35*a* penetrates the lid portion 32 in the vertical direction Dv. That is, the pipe portion 35*a* penetrates the lid portion 32 in the extension direction De. Specifically, the pipe portion 35*a* penetrates the region between the pair of rods 37 when viewed from the extension direction De in which the rods 37 extend. One end of the pipe portion 35*a* is connected to the cleaning liquid supply line 301 (the connection is not shown), the other end of the pipe portion 35*a* is positioned in the valve chamber R.

The nozzle portion 35*b* is a circular nozzle for injecting the cleaning liquid W guided by the pipe portion 35*a* into the valve chamber R. The nozzle portion 35*b* is disposed in the valve chamber R. The nozzle portion 35*b* is connected to the other end of the pipe portion 35*a*. The nozzle portion 35*b* sprays the cleaning liquid W in a conical shape toward the bottom surface 31*d* of the valve box main body 31 in the valve chamber R. An apex angle of a cone when the cleaning liquid W sprayed by the nozzle portion 35*b* in the present embodiment spreads in a conical shape is, for example, 80° to 100°.

In the present embodiment, the valve lid 25 is constituted by the lid portion 32 and the cleaning nozzle 35.

(Drive Mechanism)

The drive mechanism 40 moves the rod 37 relative to the lid portion 32 in the vertical direction Dv. The drive mechanism 40 is disposed outside the valve box 30. The drive mechanism 40 is formed of an actuator 400, a pivot shaft 401, a pivot shaft support portion 402, a first connecting portion 403, and a second connecting portion 404.

The actuator 400 includes a shaft 400*b* extending in the vertical direction Dv (extension direction De) and an actuator main body 400*a* that moves the shaft 400*b* in the vertical direction Dv. The actuator main body 400*a* is supported outside the valve box by a frame or the like (not shown). The actuator main body 400*a* moves the shaft 400*b* in the vertical direction Dv by being controlled by an internal control device (not shown).

The pivot shaft 401 is a member formed in a cylindrical shape. The pivot shaft 401 is made of, for example, a metal or the like. An end part of the pivot shaft 401 is connected to the shaft 400*b* so as to be rotatable about a rotating axis O extending in the horizontal direction with the movement of the shaft 400*b* of the actuator 400. The pivot shaft 401 in the present embodiment rotates about the rotating axis O. The rotating axis O and the axis Ar in the present embodiment are perpendicular to each other when viewed from the upper side Dvu.

The pivot shaft support portion 402 rotatably supports the pivot shaft 401 from the lower side Dvd. The pivot shaft support portion 402 connects the front surface 32*a* of the lid portion 32 and an outer peripheral surface of the pivot shaft 401. The pivot shaft support portion 402 is made of, for example, a metal or the like. In the present embodiment, a pair of the pivot shaft support portions 402 rotatably support the pivot shaft 401 from the lower side Dvd.

The first connecting portion 403 is integrally fixed to the pivot shaft 401. The first connecting portion 403 rotates about the rotating axis O with the rotation of the pivot shaft 401. The first connecting portion 403 is formed in a plate shape that spreads in a flange shape with respect to the pivot shaft 401. That is, the first connecting portion 403 spreads in a direction perpendicular to the rotating axis O. The number of first connecting portions 403 disposed on the pivot shaft 401 is the same as the number of the rods 37. That is, a pair of first connecting portions 403 are disposed on the pivot shaft 401. The first connecting portion 403 is made of, for example, a metal or the like.

The second connecting portion 404 extends in the vertical direction Dv (extension direction De). As shown in FIG. 3, the second connecting portion 404 connects a portion of the first connecting portion 403 on the one side Dal with respect to the pivot shaft 401 and an end part of the rod 37 on the upper side Dvu. The second connecting portion 404 is connected to the first connection portion 403 so as to be movable in the vertical direction Dv with the rotation of the first connecting portion 403 about the rotating axis O. The second connecting portion 404 is made of, for example, a metal or the like.

(Spring Support)

As shown in FIGS. 2 and 3, the spring support 41 is disposed outside the valve box 30 and fixed to the pair of rods 37. The spring support 41 connects the pair of rods 37 to each other. The spring support 41 in the present embodiment is formed in a plate shape to connect the end parts on the upper side Dvu in the rods 37. The spring support 41 is made of, for example, a metal or the like. The spring support 41 includes a main body portion 42 disposed between the pair of rods 37, a fixed portion 43 integrally formed with the main body portion 42 and connecting the main body portion 42 and the rods 37, and a cover portion 44.

The main body portion 42 is formed in a plate shape. The main body portion 42 includes an upper surface 42*c* facing the upper side Dvu, a lower surface 42*d* facing an opposite side to the upper surface 42*c*, and a main body portion side surface 42*e* connecting the upper surface 42*c* and the lower surface 42*d*. The lower surface 42*d* faces the front surface 32*a* of the lid portion 32 in the vertical direction Dv (extension direction De) while spaced from the front surface 32*a*. The main body portion side surface 42*e* corresponds to a thickness of the main body portion 42 formed in a plate shape. As also shown in FIG. 4, a pair of recessed portions 42*a* recessed from the main body portion side surface 42*e* facing the one side Dal toward the other side Dar are formed on the main body portion 42.

The fixed portion 43 is formed in a plate shape. A pair of fixed portions 43 are formed integrally with the main body portion 42. Specifically, each of the pair of fixed portions 43 connects the main body portion side surface 42*e* of the main body portion 42 facing the separation direction D1 and an outer peripheral surface of the rod 37. A thickness of the fixed portion 43 in the present embodiment is thinner than the thickness of the main body portion 42.

The cover portion 44 is formed in a prism shape. The cover portion 44 abuts on the main body portion side surface 42*e* of the main body portion 42 facing the one side Dal, from the one side Dal. In the present embodiment, a surface of the cover portion 44 that abuts on the main body portion 42 is an abutting surface 44*a*. The abutting surface 44*a* abuts on the main body portion side surface 42*e* of the main body portion 42 facing the one side Dal, thereby forming an insertion hole 41*a*. Therefore, a pair of insertion holes 41*a* are formed in the spring support 41 in the present embodiment. The cover portion 44 is fixed to the main body portion 42 with a plurality of cover bolts 44*b*. Here, as shown in FIGS. 2 to 4, the pipe portion 35*a* of the cleaning nozzle 35 is inserted into the insertion hole 41*a* of the spring support 41.

Figure 4:
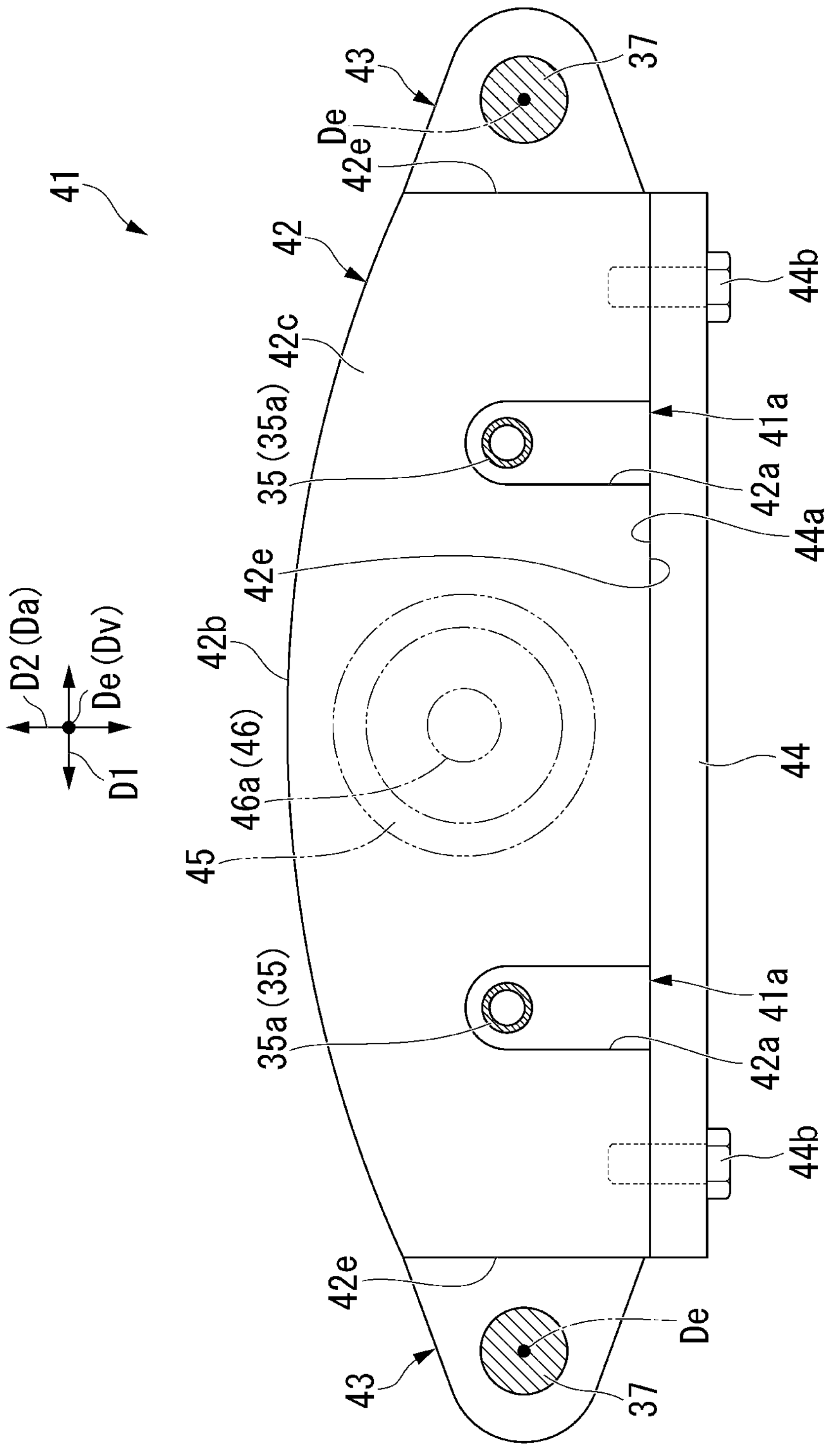
FIG. 4 is a view of a spring support of the valve device according to the embodiment of the present disclosure from an extension direction.

As shown in FIG. 4, a convex curved surface 42*b* is formed on the main body portion 42. The convex curved surface 42*b* is formed to gradually increase in a plate width direction D2 from end parts in the separation direction D1 in which the pair of rods 37 are connected toward the center in the separation direction D1, when viewed from the extension direction De. The plate width direction D2 is a direction perpendicular to each of the extension direction De and the separation direction D1. The convex curved surface 42*b* is connected to a pair of main body portion side surfaces 42*e* facing the separation direction D1. Thus, even when the recessed portion 42*a* constituting the insertion hole 41*a* is formed in the main body portion 42, reduction in rigidity of the main body portion 42 can be suppressed.

(Spring)

The spring 45 is a coil spring that biases the spring support 41 toward the lid portion 32. The spring 45 is made of, for example, a metal or the like. As shown in FIGS. 2 and 3, the spring 45 is disposed outside the valve box 30. The spring 45 abuts on the upper surface 42*c* of the spring support 41 from the upper side Dvu (extension direction De).

(Spring Support Portion)

The spring support portion 46 supports the spring 45 on the spring support 41. The spring support portion 46 is disposed outside the valve box 30. The spring support portion 46 is made of, for example, a metal or the like. The spring support portion 46 includes a first support portion 46*a*, a second support portion 46*b*, and a connecting portion 46*c*.

The first support portion 46*a* is formed in a columnar shape extending in the vertical direction Dv. The first support portion 46*a* is disposed inside the spring 45. An end part on the lower side Dvd of the first support portion 46*a* is fixed to the upper surface 42*c* of the main body portion 42 of the spring support 41. An end part on the upper side Dvu of the first support portion 46*a* protrudes to the upper side Dvu with respect to an end part of the upper side Dvu of the spring 45. Hereinafter, for convenience of description, a portion of the first support portion 46*a* that protrudes to the upper side Dvu with respect to the spring 45 will be referred to as a "protruding portion 46*p*" (see FIG. 2).

The second support portion 46*b* is formed in a columnar shape extending in the vertical direction Dv. The second support portion 46*b* is disposed outside the spring 45. An end part on the lower side Dvd of the second support portion 46*b* is fixed to the front surface 32*a* of the lid portion 32.

The connecting portion 46*c* is a member that integrally connects the first support portion 46*a* and the second support portion 46*b*. The connecting portion 46*c* connects the protruding portion 46*p* of the first support portion 46*a* and an end part on the upper side Dvu of the second support portion 46*b*. The connecting portion 46*c* is formed in a plate shape. The connecting portion 46*c* has a first surface 46*d* facing the upper side Dvu and a second surface 46*e* facing an opposite side to the first surface 46*d*.

Here, the end part on the upper side Dvu of the spring 45 is connected to the second surface 46*e* of the connecting portion 46*c*. The spring 45 is compressed between the second surface 46*e* of the connecting portion 46*c* and the upper surface 42*c* of the spring support 41. Thus, the spring 45 biases the spring support 41 toward the lid portion 32. In other words, the pair of rods 37 integrally connected to the spring support 41, the inner bar 36 connected to the pair of rods 37, and the plurality of valve bodies 34 connected to the inner bar 36 are each biased toward the lower side Dvd.

(Thermometer)

The thermometer 38 is a sensor capable of measuring a temperature of the steam V in the valve chamber R. The thermometer 38 is disposed with respect to the lid portion 32 while penetrating the lid portion 32. The thermometer 38 in the present embodiment includes a probe, such as a thermocouple. The thermometer 38 measures the temperature of the steam V in the valve chamber R by disposing the probe in the valve chamber R.

(Pressure Gauge)

The pressure gauge 39 is a sensor capable of measuring a pressure of the steam V in the valve chamber R. The pressure gauge 39 is disposed with respect to the lid portion 32 while penetrating the lid portion 32. The pressure gauge 39 measures the pressure of the steam V in the valve chamber R by extracting some of the steam V in the valve chamber R to the outside of the valve box 30.

Here, the thermometer 38 and the pressure gauge 39 are disposed with the pair of rods 37 therebetween in the separation direction D1 in which the pair of rods 37 are connected, when viewed from the extension direction De.

(Action Effect)

The valve box 30 of the valve device 3 according to the above embodiment includes the lid portion 32 that is attachable to and detachable from the valve box main body 31 and closes the opening portion 31*c*, and the cleaning nozzle 35 disposed while penetrating the lid portion 32 and capable of supplying the cleaning liquid W into the valve chamber R from the outside.

Accordingly, for example, the cleaning nozzle 35 can be attached to the valve box 30 not including the cleaning nozzle 35 by replacing only the lid portion 32. In addition, for example, a size of the valve box main body 31 can be reduced compared with the valve box 30 including the cleaning nozzle 35 penetrating the valve box main body 31.

Therefore, it is possible to reduce a size of the valve device 3 as a whole while suppressing the manufacturing and maintenance costs of the valve device 3. That is, it is possible to reduce the cost required for adding the function of supplying the cleaning liquid W into the flow passage Ct and to ensure maintainability.

In addition, in the embodiment, the pair of rods 37 are disposed with respect to the lid portion 32 while separated from each other, and the cleaning nozzle 35 is disposed in a region between the pair of rods 37, when viewed from the extension direction De in which the rods 37 extend. Here, since the pair of rods 37 support the inner bar 36 such that the inner bar 36 is suspended from the upper side Dvu, the rods 37 are disposed with respect to the lid portion 32 in a well-balanced manner so as to be symmetrical in the separation direction D1, when viewed from the extension direction De.

Thus, the cleaning liquid W supplied from the cleaning nozzle 35 is supplied into the valve chamber R from between the pair of rods 37. That is, the cleaning liquid W is supplied into the valve chamber R from the more central side of the lid portion 32 by the cleaning nozzle 35. Therefore, it is possible to reduce the thermal influence that the cleaning liquid W supplied into the valve chamber R receives from the valve box main body 31 in the valve chamber R.

In addition, in the embodiment, the thermometer 38 and the pressure gauge 39 are disposed to penetrate the lid portion 32, and the thermometer 38 and the pressure gauge 39 are disposed with respect to the lid portion 32 with the pair of rods 37 therebetween in the separation direction D1 in which the pair of rods 37 are connected, when viewed from the extension direction De.

Thus, at least the rod 37 is interposed between the cleaning nozzle 35 and the thermometer 38 and between the cleaning nozzle 35 and the pressure gauge 39 in the lid portion 32. For this reason, compared with a case where the rod 37 is not interposed, measurement results of the thermometer 38 and the pressure gauge 39 when the cleaning liquid W is supplied into the valve chamber R can be restrained from being affected by the cleaning liquid W. In addition, for example, when an abnormality occurs in one or more of the thermometer 38 and the pressure gauge 39, one or more of the thermometer 38 and the pressure gauge 39 can be easily maintained by removing only the lid portion 32.

In the embodiment, since the spring support 41 is pressed by the spring 45, when the valve body 34 seals the outlet flow passage 31*b* through which the steam V flows between the valve chamber R and the flow passage Ct, backflow of the steam V from the flow passage Ct to the valve chamber R can be suppressed. In addition, in the embodiment, the spring support 41 is pressed by the spring 45 to offset force exerted on the rod 37 in the vertical direction Dv due to a pressure difference. Further, the spring support 41 includes the insertion hole 41*a* through which the cleaning nozzle 35 is inserted. Thus, it is possible to suppress an increase in size of the lid portion 32.

Other Embodiment

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

A configuration of the valve device 3 may be applied to the main steam valve 2.

In the embodiment, the configuration in which the valve box 30 of the valve device 3 is disposed on the upper side Dvu with respect to the turbine main body 1 has been described, but the present invention is not limited to this configuration. In this case, the extension direction De and the vertical direction Dv need not match each other. For example, the valve box 30 may be disposed laterally or obliquely with respect to the turbine main body 1.

In the embodiment, the configuration in which a pair of the cleaning nozzles 35 are disposed with respect to the lid portion 32 has been described, but the present invention is not limited to this configuration. That is, the valve box 30 may include one cleaning nozzle 35. Alternatively, the valve box 30 may include three or more cleaning nozzles 35.

In the embodiment, the configuration in which the nozzle portion 35*b* of the cleaning nozzle 35 sprays the cleaning liquid W in a conical shape toward the bottom surface 31*d* in the valve box main body 31 in the valve chamber R has been described, but the present invention is not limited to this configuration. The nozzle portion 35*b* may be angled to hit a predetermined location on the inner surface 31*i* of the valve box 30, for example. In addition, the pipe portion 35*a* of the cleaning nozzle 35 may extend in the extension direction De toward the bottom surface 31*d* in the valve chamber R, and the nozzle portion 35*b* may be disposed in the vicinity of the inner bar 36.

APPENDIX

The valve device according to the embodiment can be understood as follows, for example.

(1) A valve device 3 according to a first aspect includes: a valve box 30 in which an inlet flow passage 31*a* into which steam V flows and an outlet flow passage 31*b* through which the steam V flows are formed, and in which a valve chamber R that connects the inlet flow passage 31*a* and the outlet flow passage 31*b* is formed; and a plurality of valve bodies 34 configured to regulate a flow rate of the steam V flowing through the outlet flow passage 31*b* by relative movement to the outlet flow passage 31*b*, in which the valve box 30 includes a valve box main body 31 in which the inlet flow passage 31*a*, the outlet flow passage 31*b*, and an opening portion 31*c* are formed, a lid portion 32 that is attachable to and detachable from the valve box main body 31 and is configured to close the opening portion 31*c*, and a cleaning nozzle 35 that is disposed to penetrate through the lid portion 32 and is configured to supply a cleaning liquid W into the valve chamber R from an outside.

Accordingly, for example, the cleaning nozzle 35 can be attached to the valve box 30 not including the cleaning nozzle 35 by replacing only the lid portion 32. In addition, for example, a size of the valve box main body 31 can be reduced compared with the valve box 30 including the cleaning nozzle 35 penetrating the valve box main body 31.

(2) A valve device 3 according to a second aspect is the valve device 3 according to (1), further including: an inner bar 36 that is connected to the plurality of valve bodies 34 and is configured to simultaneously move the plurality of valve bodies 34 in the valve chamber R; and a pair of rods 37 that are disposed to penetrate the lid portion 32 and are connected to the inner bar 36, the pair of rods 37 are configured to move the inner bar 36 relative to the outlet flow passage 31*b* by relative movement to the lid portion 32, in which the pair of rods 37 may be disposed with respect to the lid portion 32 at a distance from each other, and the cleaning nozzle 35 may be disposed in a region between the pair of rods 37 when viewed from an extension direction De in which each of the pair of rods 37 extends.

Thus, the cleaning liquid W supplied from the cleaning nozzle 35 is supplied into the valve chamber R from between the pair of rods 37. That is, the cleaning liquid W is supplied into the valve chamber R from the more central side of the lid portion 32 by the cleaning nozzle 35.

(3) A valve device 3 according to a third aspect is the valve device 3 according to (2), further including: a thermometer 38 that is disposed to penetrate the lid portion 32 and is configured to measure a temperature of the steam V in the valve chamber R; and a pressure gauge 39 that is disposed to penetrate the lid portion 32 and is configured to measure a pressure of the steam V in the valve chamber R, in which the thermometer 38 and the pressure gauge 39 may be disposed with respect to the lid portion 32 with the pair of rods 37 therebetween in a separation direction D1 connecting the pair of rods 37, when viewed from the extension direction De.

Thus, at least the rod 37 is interposed between the cleaning nozzle 35 and the thermometer 38 and between the cleaning nozzle 35 and the pressure gauge 39 in the lid portion 32. For this reason, compared with a case where the rod 37 is not interposed, measurement results of the thermometer 38 and the pressure gauge 39 when the cleaning liquid W is supplied into the valve chamber R can be prevented from being affected by the cleaning liquid W.

(4) A valve device 3 according to a fourth aspect is the valve device 3 according to (2) or (3), further including: a drive mechanism 40 that is disposed outside the valve box 30 and configured to move the pair of rods 37 back and forth; a spring support 41 that has a plate shape, is disposed outside the valve box 30, and is fixed to the pair of rods 37, the spring support 41 connecting the pair of rods 37 to each other; and a spring that is disposed outside the valve box 30 and biases the spring support 41 toward the lid portion 32 while abutting on the spring support 41, in which the spring support 41 may have an insertion hole 41*a* through which the cleaning nozzle 35 is inserted.

Thus, since the spring support 41 is pressed by the spring 45, when the valve body 34 seals the outlet flow passage 31*b*, backflow of the steam V to the valve chamber R can be suppressed. Further, since a part of the cleaning nozzle 35 is accommodated in the recessed portion 42*a* of the spring support 41, an increase in size of the lid portion 32 can be suppressed.

(5) A valve lid 25 according to a fifth aspect includes: a lid portion 32 that is attachable to and detachable from a valve box 30 including a valve chamber R and is configured to close an opening portion 31*c* of the valve box 30; and a cleaning nozzle 35 that is disposed to penetrate the lid portion 32 and is configured to supply a cleaning liquid W into the valve chamber R from an outside.

EXPLANATION OF REFERENCES

1: Turbine main body
2: Main steam valve
3: Valve device
4: Main stop valve
10: Turbine casing
10*a*: Casing main body
10*b*: Stator vane rows
10*c*: Partition plate
11: Turbine rotor
11*a*: Rotating shaft
11*b*: Rotor blade row
25: Valve lid
30: Valve box
30*a*: Bolt
31: Valve box main body
31*a*: Inlet flow passage
31*b*: Outlet flow passage
31*c*: Opening portion
31*d*: Bottom surface
31*e*: Side surface
31*f*: Hole
31*i*: Inner surface
32: Lid portion
32*a*: Front surface
32*b*: Back surface
33: Valve seat portion
34: Valve body
34*a*: Shaft portion
34*b*: Sealing portion
35: Cleaning nozzle
35*a*: Pipe portion
35*b*: Nozzle portion
36: Inner bar
37: Rod
38: Thermometer
39: Pressure gauge

40: Drive mechanism
41: Spring support
41*a*: Insertion hole
42: Main body portion
42*a*: Recessed portion
42*b*: Convex curved surface
42*c*: Upper surface
42*d*: Lower surface
42*e*: Main body portion side surface
43: Fixed portion
44: Cover portion
44*a*: Abutting surface
44*b*: Cover bolt
45: Spring
46: Spring support portion
46*a*: First support portion
46*b*: Second support portion
46*c*: Connecting portion
46*d*: First surface
46*e*: Second surface
46*p*: Protruding portion
100: Steam turbine
200: Steam supply source
201: First steam supply line
202: Second steam supply line
300: Cleaning liquid supply source
301: Cleaning liquid supply line
302: Steam line
303: Extraction line
304: Extracted steam outlet
400: Actuator
400*a*: Actuator main body
400*b*: Shaft
401: Pivot shaft
402: pivot shaft support portion
403: First connecting portion
404: Second connecting portion
500: Compressor
Ar: Axis
Ct: Flow passage
D1: Separation direction
D2: Plate width direction
Da: Axial direction
Dal: One side
Dar: Other side
De: Extension direction
Dv: Vertical direction
Dvd: Lower side
Dvu: Upper side
O: Rotating axis
R: Valve chamber
V: Steam
W: Cleaning liquid

What is claimed is:

1. A valve device comprising:

a valve box in which an inlet flow passage into which steam flows and an outlet flow passage through which the steam flows are formed, and in which a valve chamber that connects the inlet flow passage and the outlet flow passage is formed; and a plurality of valve bodies configured to regulate a flow rate of the steam flowing through the outlet flow passage by relative movement to the outlet flow passage, wherein the valve box includes a valve box main body in which the inlet flow passage, the outlet flow passage, and an opening portion are formed, a lid portion that is attachable to and detachable from the valve box main body and is configured to close the opening portion, and a cleaning nozzle that is disposed to penetrate through the lid portion and is configured to supply a cleaning liquid into the valve chamber from an outside.

2. The valve device according to claim 1, further comprising:

an inner bar that is connected to the plurality of valve bodies and is configured to simultaneously move the plurality of valve bodies in the valve chamber; and a pair of rods that are disposed to penetrate the lid portion and are connected to the inner bar, the pair of rods are configured to move the inner bar relative to the outlet flow passage by relative movement to the lid portion, wherein the pair of rods are disposed with respect to the lid portion at a distance from each other, and the cleaning nozzle is disposed in a region between the pair of rods, when viewed from an extension direction in which each of the pair of rods extends.

3. The valve device according to claim 2, further comprising:

a thermometer that is disposed to penetrate the lid portion and is configured to measure a temperature of the steam in the valve chamber; and a pressure gauge that is disposed to penetrate the lid portion and is configured to measure a pressure of the steam in the valve chamber, wherein the thermometer and the pressure gauge are disposed with respect to the lid portion with the pair of rods therebetween in a separation direction connecting the pair of rods, when viewed from the extension direction.

4. The valve device according to claim 2, further comprising:

a drive mechanism that is disposed outside the valve box and configured to move the pair of rods back and forth;

a spring support that has a plate shape, is disposed outside the valve box, and is fixed to the pair of rods, the spring support connecting the pair of rods to each other; and a spring that is disposed outside the valve box and biases the spring support toward the lid portion while abutting on the spring support, wherein the spring support has an insertion hole through which the cleaning nozzle is inserted.

* * * * *